United States Patent [19]

Wern et al.

[11] 3,903,362

[45] Sept. 2, 1975

[54] METHOD AND APPARATUS FOR SAMPLING A QUASI-STATIONARY SIGNAL PROGRESSIVELY DURING A SAMPLING PERIOD COMPRISING A PLURALITY OF SUCCESSIVE PERIODS OF A FUNDAMENTAL COMPONENT IN THE SIGNAL

[76] Inventors: Carl Rune Wern; George Herman Wern, both of Vartavagen 59, 115 38 Stockholm, Sweden

[22] Filed: Feb. 8, 1974

[21] Appl. No.: 440,737

[30] Foreign Application Priority Data

Feb. 14, 1973 Sweden .............................. 7302045

[52] U.S. Cl. ........... 178/6.8; 178/DIG. 3; 179/2 TV

[51] Int. Cl. ............................................. H04n 1/02

[58] Field of Search ..................... 178/DIG. 3, 6,6.8; 179/2 TV

[56] References Cited

UNITED STATES PATENTS

| | | | |
|---|---|---|---|
| 3,284,567 | 11/1966 | Southworth | 178/DIG. 3 |
| 3,588,329 | 6/1971 | Monk | 178/DIG. 3 |
| 3,663,749 | 5/1972 | Cannon | 178/6.8 |
| 3,715,483 | 2/1973 | Limb | 178/DIG. 3 |
| 3,752,911 | 8/1973 | Morchand | 178/DIG. 3 |
| 3,801,737 | 4/1974 | Komura | 178/DIG. 3 |
| 3,842,199 | 10/1974 | Gibson | 179/2 TV |

*Primary Examiner*—Howard W. Britton
*Assistant Examiner*—Michael A. Masinick
*Attorney, Agent, or Firm*—Strauch, Nolan, Neale, Nies & Kurz

[57] ABSTRACT

The invention refers to a method and apparatus for sampling a quasi-stationary signal progressively during a sampling period comprising a plurality of successive periods of a fundamental component in the signal. The method comprises the steps of continuously counting during a plurality of successive sampling periods the actual number of periods of said fundamental component occurring after a selected starting sampling period, successively prolonging said sampling periods in dependence on the increasing magnitude of said counted number, and progressively sampling said signal during said successively prolonged sampling periods.

5 Claims, 6 Drawing Figures

METHOD AND APPARATUS FOR SAMPLING A QUASI-STATIONARY SIGNAL PROGRESSIVELY DURING A SAMPLING PERIOD COMPRISING A PLURALITY OF SUCCESSIVE PERIODS OF A FUNDAMENTAL COMPONENT IN THE SIGNAL

The invention relates to a method and apparatus for sampling a quasi-stationary signal progressively during a sampling period comprising a plurality of successive periods of a fundamental component in the signal.

U.S. Pat. No. 3,663,749 describes a method of sampling a stationary video signal corresponding to a static camera image progressively during a sampling period comprising 96 successive pictures. These have a repetition rate of 30 Hz implying that the sampling period must have a duration of 3.2 seconds. The described method of sampling progressively results here in that the video signal is converted to a band-width compressed signal. According to an example of an embodiment, it has a band-width slightly less than 50 kHz. It is pointed out that the video signal can of course be converted to a further compressed signal having a band-width sufficiently narrow to enable transmission over a conventional audio channel. This must, however imply a prolongation of the duration of the sampling period from 3.2 seconds to about 1 minute.

It is obvious that the duration of the sampling period makes a video signal corresponding to moving camera images impossible to sample progressively in the known way to be converted to a signal that can be transmitted over a conventional audio channel. It is also generally recognized, e.g., in connection with so-called sampling oscilloscopes, that sampling progressively demands a stationary signal.

An object of the invention is to provide a method of sampling a quasi-stationary signal progressively during a sampling period comprising a plurality of successive periods of a fundamental component in the signal.

Another object of the invention is to provide a picture transmitter capable of transmitting moving as well as static images over a conventional audio channel.

A further object of the invention is to provide for that said picture transmitter shall be compatible with television equipment for 25 pictures per second and 625 lines per picture in accordance with the CCIR-standard.

Figures 1, 2:
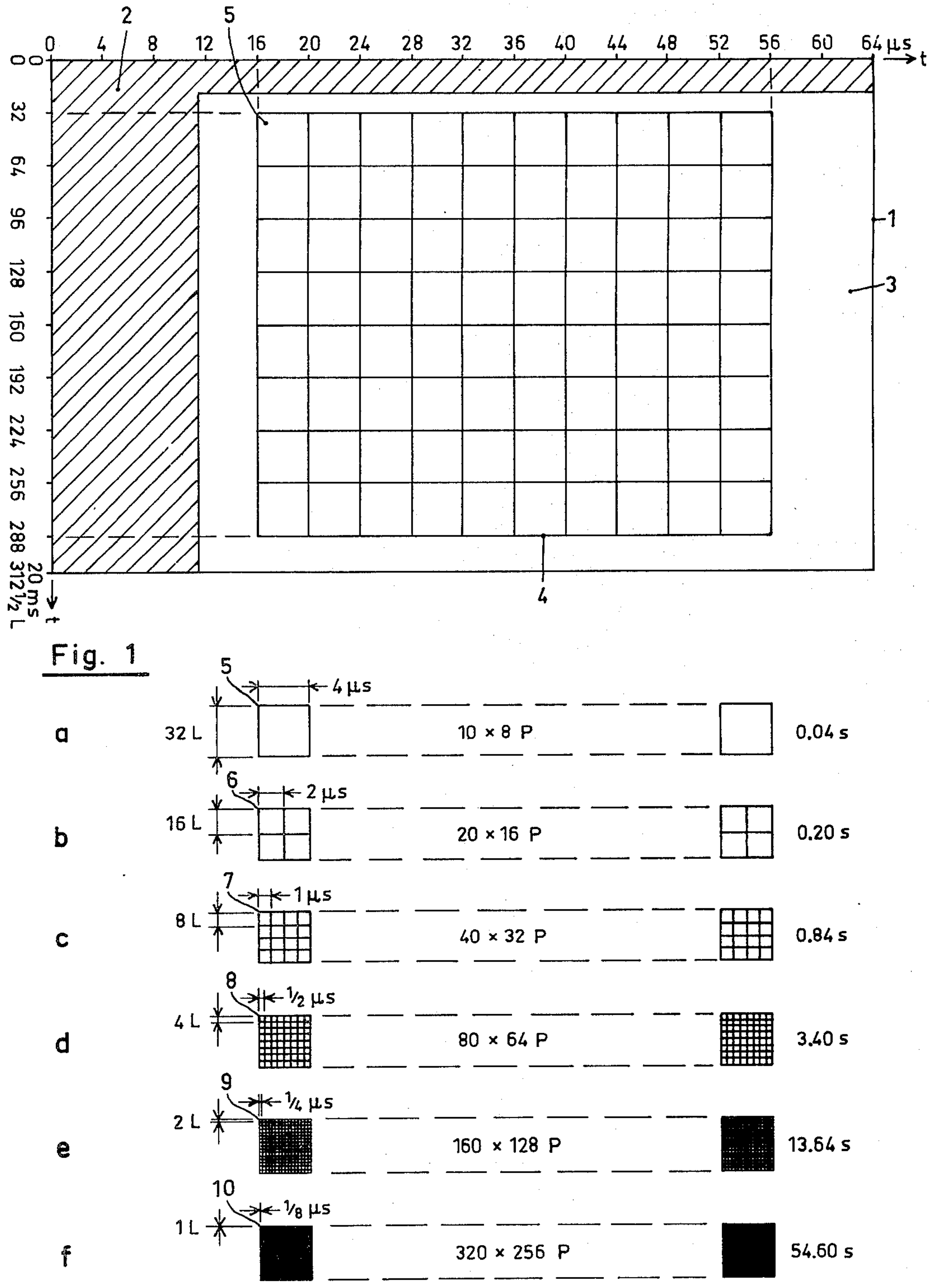
Figure 3:
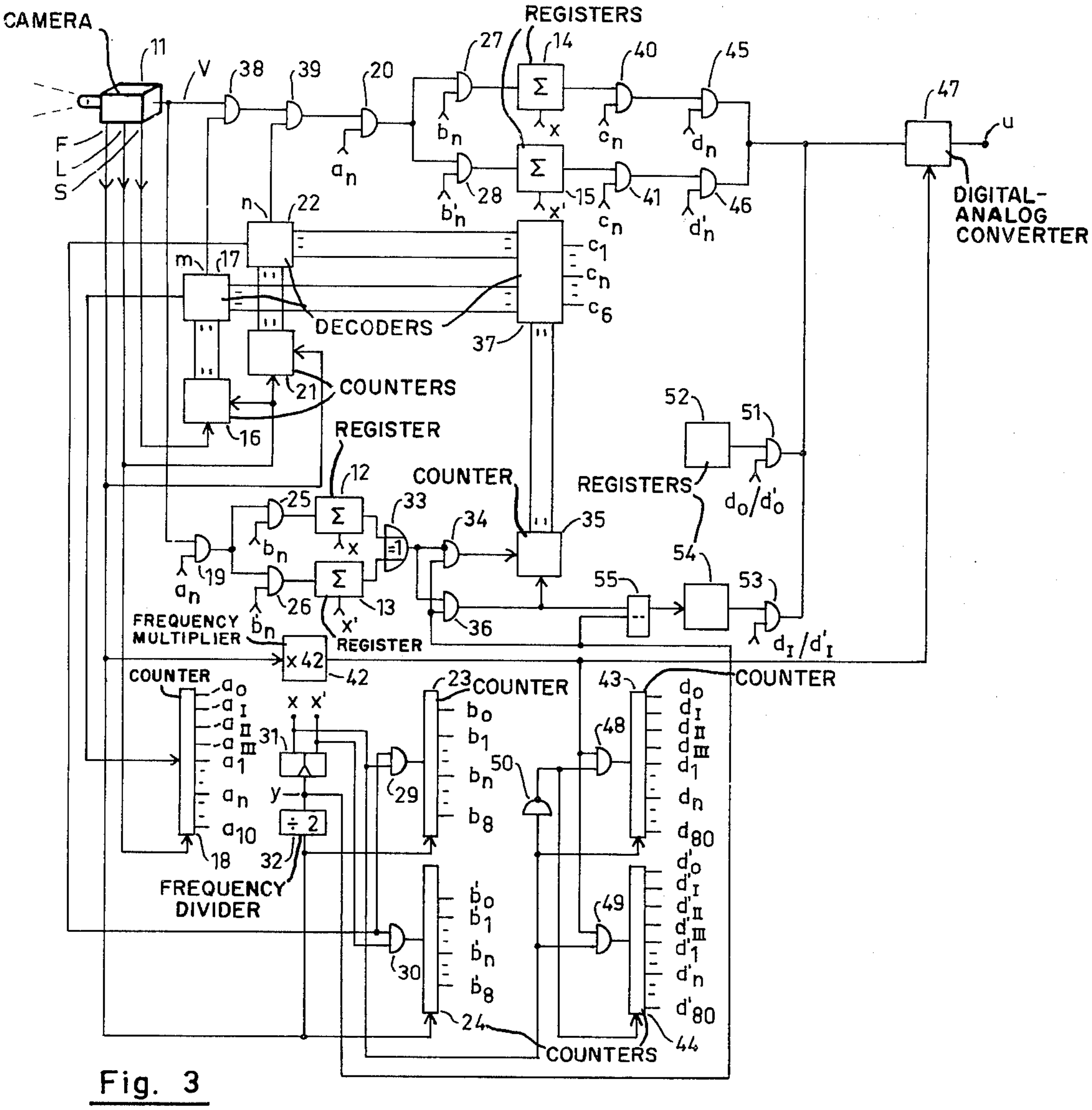
Figure 4:
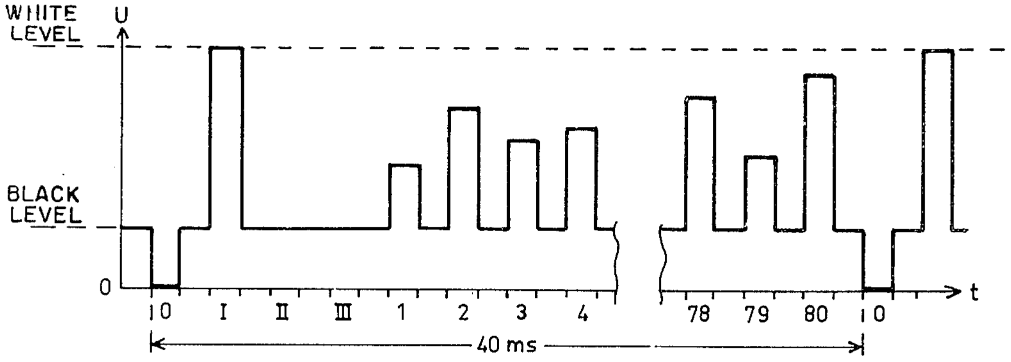
Figure 5:
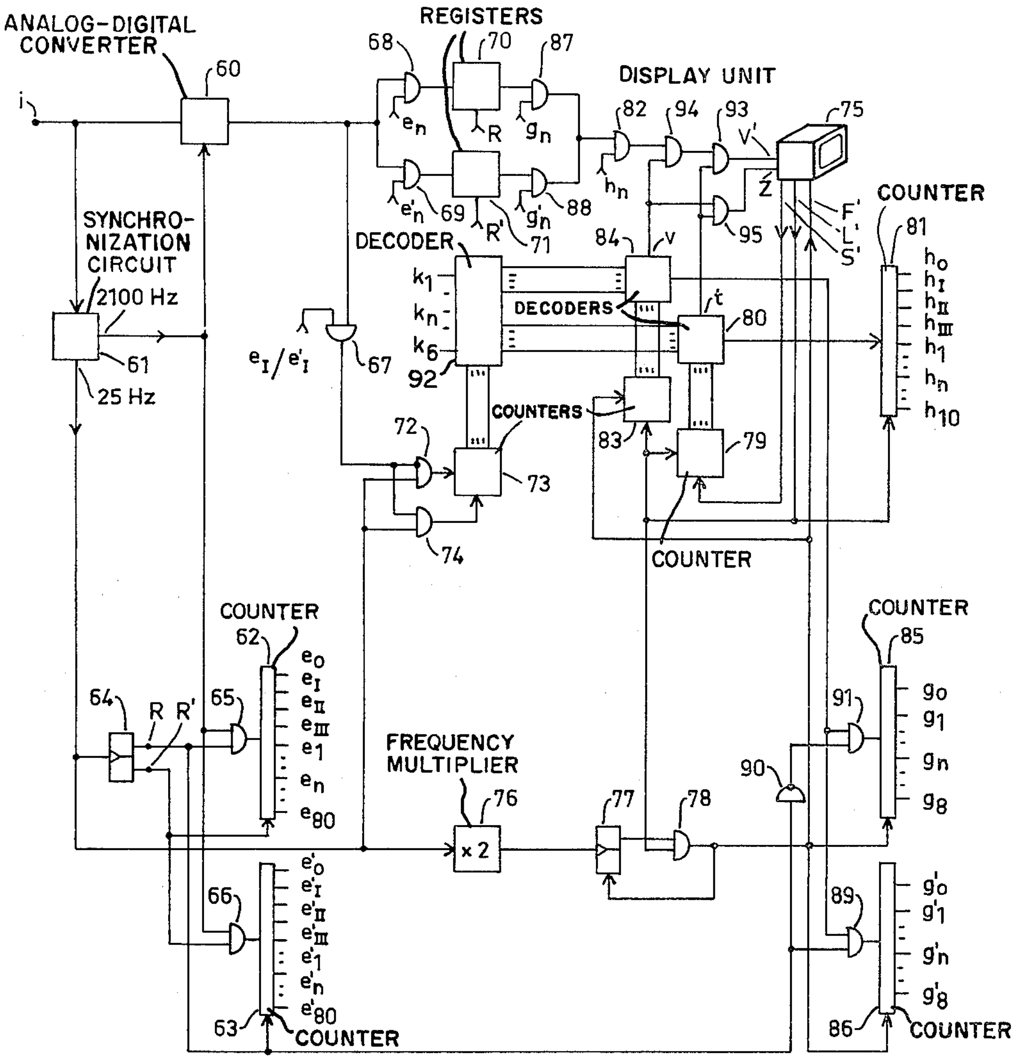
Figure 6:
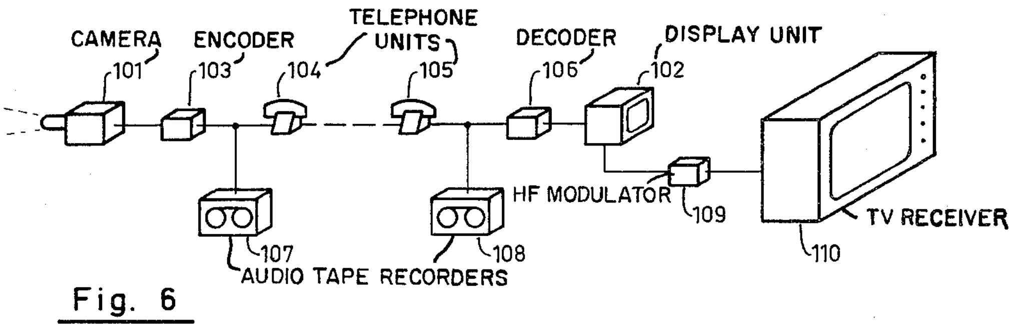

The invention, the characteristic features of which are stated in the appended claims, will now be described in detail with reference made to the accompanying drawings where FIG. 1 shows a picture field that contains a time frame divided into 80 time slots, FIG. 2 shows the time slots of FIG. 1 divided into a successively increased number of sub time slots, FIG. 3 shows a picture transmitter embodying features of the invention, FIG. 4 shows a transmission signal generated by the picture transmitter shown in FIG. 3, FIG. 5 shows an picture receiver adapted to the transmission signal shown in FIG. 4, and FIG. 6 shows an application for the picture transmitter and the picture receiver of FIG. 3 and FIG. 5, respectively.

FIG. 1 shows a picture field 1 according to the CCIR television transmission standard. The picture field 1 has a measure of 20 milliseconds along a vertical time axis and 64 microseconds along a horizontal time axis representing the fact that the picture field 1 has a repetition rate of 50 Hz and alternately comprises 312½ odd and even, respectively, lines L that are interlaced to form a picture in the known way. When the picture field 1 is scanned by an electron beam in a picture tube of a picture receiver, the scanning retrace reduces it about 6 percent along the vertical time axis and 18 percent along the horizontal time axis as hatched area 2 indicates. There remains thus an effective picture area 3 and this contains according to the example a time frame 4 divided into 80 time slots 5 each occupying 32 lines L along the vertical time axis and 4 microseconds along the horizontal time axis. The time frame 4 is positioned at a distance of 1 time slot 5 from the origin of the vertical time axis and 4 time slots 5 from the origin of the horizontal time axis whereby a sufficient margin is provided with respect to the area 2 representing the scanning retrace.

According to the CCIR-standard for television transmission, the ratio between the height and the width of the picture is ¾. The effective picture area 3 in FIG. 1 has approximately this ratio and consequently the time slots 5 that have the form of squares in FIG. 1 will maintain this form on the picture screen of a CCIR-receiver. Since each time slot 5 comprises 32 lines L along the vertical time axis and 4 microseconds along the horizontal time axis, a symmetrical picture resolution requires a picture element to be reproducable in 4/32 microseconds. According to the example, the instantaneous amplitude of a CCIR video signal is therefore sampled at a sampling frequency of 8 MHz resulting in $32 \times 32 \times 2 = 2^{11}$ amplitude values per time slot 5 per picture.

According to the example, the amplitude values sampled from the video signal are binary coded and are during the time slots 5 read into a first group of accumulating storage media associated with the time slots 5. The signal content in every new picture is compared with the signal content in the preceding picture with respect to the accumulated contents in the storage media associated with the time slots 5 to determine when equal pictures occur, and the actual number of pictures that are in succession determined to be equal is continuously counted. The video signal is sampled progressively during a sampling period comprising a number of successive pictures that is equal to a power of two with an even integer exponent and that is increased in dependence on those actual number increases. The sampling of the video signal comprises the steps of reading its binary coded amplitude values into a second group of accumulating storage media associated with the time slots 5, the reading process taking place during the whole duration of the time slots 5, or, alternatively during progressively selected sub time slots comprising a number of amplitude values of the video signal equal to a power of two with an odd integer as exponent, and thereafter reading out the average value of these amplitude values by reading out the accumulated sums in the second group of storage media with the least significant bit position shifted to the left a number of positions equal to said odd integer.

FIG. 2 shows the time slots 5 in FIG. 1 divided into a successively increased number of sub time slots, line *a* showing the time slot 5 that corresponds to $2^{11}$ amplitude values and is sampled during 1 picture period of 0.04 seconds consisting of two consecutive picture fields for odd and even, respectively, lines L, line *b* showing a sub time slot 6 that corresponds to $2^9$ amplitude values and is during $2^2$ picture periods sampled progressively from the left side to the right side and from the upper side to the lower side within the time slot 5, line *c* showing a sub time slot 7 that corresponds to $2^7$ amplitude values and is sampled in corresponding way during $2^4$ picture periods, line *d* showing a sub time slot 8 that corresponds to $2^5$ amplitude values and is sampled during $2^6$ picture periods, line *e* showing a sub time slot 9 that corresponds to $2^3$ amplitude values and is sampled during $2^8$ picture periods, and line f showing a sub time slot 10 that corresponds to 2 amplitude values and is sampled during $2^{10}$ picture periods.

It should be noted that the picture information in odd and even picture fields is integrated during each picture period of 0.04 seconds. It should also be noted that when new picture information is provided and is repeated during a number of picture periods, the sampling period will according to the principle of the invention comprise a successively increased number of picture periods so that 10 × 8 samples P of the picture information in the video signal is obtained after 0.04 seconds, 20 × 16 samples P after 0.2 seconds, 40 × 32 samples P after 0.84 seconds, 80 × 64 samples P after 3.4 seconds, 160 × 128 samples P after 13.64 seconds and 320 × 256 samples P after 54.60 seconds. Moving images will then result in 80 samples P per sampling period. However, when the motion stops and a static image is obtained, the number of samples P per sampling period is successively increased up to a maximum of 81,920.

Due to the above-mentioned averaging of the amplitude values within the time slots 5 – 10, the 80 samples P per picture period corresponding to 2,000 samples P per second are in the completed sampling period irrespective of the number of picture periods and this comprises the video signal information in all the 81,920 picture elements within the time frame 4 in FIG. 1. In the method to sample of the invention the video signal is first sampled with respect to its low frequency components and is thereafter sampled with respect to its compenents of higher frequencies. This is advantageous when the video signal is quasi-stationary, corresponding to quasi-stationary images, such as static images that are changed with intermittent time intervals, portraits accompanying a conversation between two persons, etc.

The application of the method of sampling invented to picture transmission is based on the concept that a viewer is distracted will tolerate a much lower number of picture elements when moving images are presented than he does when the picture information is static, and major changes of the picture are exactly the type of information on motion that is most important to transmit in connection with for example portrait transmittals. It has been shown, see for example page 34 in the article "Communication" by John R. Pierce, Scientific American, September 1972, that a number of picture elements in the order of 100 is sufficient to make a face recognizable.

According to FIG. 2, the method of sampling invention yields during moving images (e.g., an angular movement of a face) pictures that have 80 picture elements and a duration of 0.04 seconds. When the motion stops the number of picture elements increases rapidly in pace with the maximum rate that the viewer is capable of perceiving so that after only 3.40 seconds the picture comprises 5,120 picture elements and needs no further improvement as regards portrait transmittals. It is here an advantage that the human eye often prefers distinct before blurred transitions between a given number of picture elements (see for example "Crispening" on page 157 in the book Information Theory by D. A. Bell, Pitman, London, 1968). It can therefore be stated that 2,000 samples P per second of a video signal taken in accordance with the principle of the invention as shown in FIGS. 1 and 2 are capable of providing moving images associated with portrait transmittals as well as static images associated with documents in which latter case the picture is successively built up to a total sum of 81,920 picture elements, Claude E. Shannon's well known formula for the transmission capacity of a channel, $C = B\ {}^2\log(1 + Ps/Pn)$, where C is the number of bits of information per second, B is the bandwidth of the channel in Hz, Ps is the average power of the signal and Pn is the average power of the noise, implies then that a low-quality audio channel that has Hz bandwidth of 2,000 hz and a ratio Ps/Pn of a few decades can be used for a picture transmission according to this invention, employing an analog transmission of ${}^2\log\ (1 + \log\ (Ps/Pn)$ values for the samples P.

FIG. 3 shows a picture transmitter according to the invention, comprising a television camera 11 wherein the instantaneous amplitude fo a CCIR video signal is sampled at a frequency of 8 MHz and coded into 5 binary bits corresponding to 32 amplitude levels. The camera 11 supplies the video signal on an output V from which it is alternately read into a first and second register group 12 and 13 and also into a third and fourth register group 14 and 15 during successive picture periods of 0.04 seconds. Each register group 12, 13, 14 and 15 comprises 80 accumulating registers having a capacity of 16 bits each and being associated with their respective time slots 5 in FIG. 1. The generation of these time slots 5 shall now be described.

Pulses that have the sampling frequency of 8 MHz are supplied by the camera 11 via an output S to step forward a counter 16 that consists of 5 flip-flops and is upon the initiation of every new line period reset by pulses having a frequency of 15,625 Hz and being supplied by the camera 11 via an output L. The counter 16 steps thereafter, through a decoder 17, a counter 18 one step forward per period of 32 samples P. The counter 18, which also is upon the initiation of every new line period reset by said pulses supplied via the output L, activates via 10 outputs $a_{1\text{-}10}$ 10 AND-gates 19 and 20 respectively during the occurrence of the time slots 5 along the horizontal time axis in FIG. 1 for reading the video signal into the register groups 12 and 13 and into the register groups 14 and 15 respectively.

The pulses that have the frequency of 15,625 Hz and are supplied via the output L step forward a counter 21 that consists of 5 flip-flops and is upon the initiation of every new picture field period reset by pulses having a frequency of 50 Hz being supplied by the camera 11 via an output F. Thereafter the counter 21 steps, through a decoder 22 and alternately during successive picture periods of 0.04 seconds, two counters 23 and 24 one step forward for each period of 32 lines L. The counters 23 and 24, which also are upon the initiation of every new picture field period reset by said pulses supplied via the output F, activate via 8 outputs $b_{1\text{-}8}$ and $b_{1\text{-}8}$ 2 AND-circuits 25 and 26 and 2 AND-circuits 27 and 28, respectively each of which consists of 8 gates, alternately during successive picture periods and during the occurrence of the time slots 5 along the vertical time axis in FIG. 1 for reading the video signal into the register groups 14 and 15 respectively.

The alternating stepping forward of the counters 23 and 24 during successive picture periods is obtained thereby that their stepping forward inputs are provided with AND-gates 29 and 30 controlled from a direct output X and from an inverting output X of a flip-flop 31 that is switched upon the initiation of every new picture period by narrow pulses having a frequency of 25 Hz and being supplied from an output Y of a frequency divider 32 to which the pulses having the frequency of 50 Hz and being supplied on the output F of the camera 11 are fed.

In order to achieve positioning of the frame 4 is positioned within the picture field 1 in accordance with FIG. 1, the counter 18 comprises four unconnected outputs $a_{0-III}$ that are the first outputs to be activated when the counter 18 is stepped forward after being reset, while the counters 23 and 24 each comprise one unconnected output $b_0$ and $b_0$ respectively that is the first output to be activated when the counters 23 and 24 are stepped forward after being reset.

The object of the register groups 12 and 13 is to determine when equal picture periods as regards the video signal occur in succession, the video signal then being assumed to be stationary for a while. This object is attained by comparing the binary sums in their 80 respective accumulating registers mutually by means of a comparison circuit 33 consisting of a plurality of exclusive OR-gates. When equal picture periods occur in succession the picture period pulses on the output Y of the frequency divider 32 are via an AND-gate 34, that has an inverting control input connected to an output of the comparison circuit 33, fed to a forward stepping input of a counter 35, consisting of 11 flip-flops. If, on the other hand different picture periods occur in succession the picture period pulses are via an AND-gate 36 that has a direct control input connected to the output of the comparison circuit 33, fed to a reset input of the counter 35.

Upon the initiation of every new picture period, those accumulating registers of the register groups 12, 13, 14 and 15 into which the video signal is to be read, are reset whereby the register groups 12 and 14 have a respective reset input connected to an output X of the flip-flop 31 while the register groups 13 and 15 have a respective reset input connected to an output X of the same flip-flop 31.

A decoder 37 is connected to the counter 35 for determining how many equal picture periods this has counted and in dependence thereon controlling the decoders 17 and 22 in such a way that outputs *m* and *n* respectively of these are activated first during the occurrence of the respective time slots 5 along the horizontal and vertical time axes respectively in FIG. 1 and thereafter during the occurrence of the sub time slots 6, 7, 8, 9 and 10 respectively of FIG. 2 selected during successive picture periods in sequential order from the left side to the right side and from the upper side to the lower side within the time slots 5. The output *m* of the decoder 17 controls then an AND-gate 38 while the output *n* of the decoder 22 controls an AND-gate 39 connected in cascade with the AND-gate 38 for reading the video signal from the output V of the camera 11 into the register groups 14 and 15 in the respective accumulating registers of which a number of amplitude values of the video signal, determined by the duration of the respective time slots 5 – 10, are accumulated.

According to the invention, the average value of the amplitude values read into the accumulating registers in the register groups 14 and 15 is to be read out from the same registers. As it is earlier mentioned, the amplitude values are coded into 5 binary bits and the time slot 5 comprises $2^{11}$, the time slot 6 comprises $2^9$, the time slot 8 comprises $2^7$, the time slot 8 comprises $2^5$, the time slot 9 comprises $2^3$, and the time slot 10 comprises 2 such amplitude values. The average value can then be obtained by reading out the accumulated binary sum in the registers of the register groups 14 and 15 with the least significant bit position shifted 11, 9, 7, 5, 3 and 1 step respectively to the left. This is achieved by means of the decoder 37 that is provided with 6 outputs $C_{1-16}$ which activate their respective AND-circuits 40 and 41 for readout from 5 positions in said accumulating registers shifted 11, 9, 7, 5, 3 and 1 step to the left with respect to the positions into which the video signal is read, the decoder 37 simultaneously controlling the decoders 17 and 22 for reading the video signal into the accumulating registers during the time slot 5 or the first selected time slot 6, subsequent time slots 6 or the first selected time slot 7, subsequent time slots 7 or the first selected time slot 8, subsequent time slots 8 or the first selected time slots 9, subsequent time slots 9 or the first selected time slot 10 and subsequent time slots 10, respectively.

The read-out of the average value of the accumulated binary sum in the respective 80 registers of the register groups 14 and 15 respectively occurs alternately during successive picture periods of 0.04 seconds, the read-out being accomplished from the register group 14 when the register group 15 is connected for reading the video signal into it and conversely. The total number of 80:0.04 = 2,000 read-outs per second are according to the example made at a rate of 2,100 Hz obtained whereby the above-mentioned pulses with the frequency of 50 Hz on the output F of the camera 11 are fed to a frequency multiplier 42 the factor of which is 42 and the output pulses of which alternately during successive picture periods step forward two counters 43 and 44 which in a sequential order activate 80 outputs $d_{1-80}$ and $d_{1-80}$ controlling 80 AND-gates 45 and 46 respectively for reading out said average values from the accumulating registers in the register groups 14 and 15 via the AND-circuits 40 and 41 to a digital-analog-converter 47. The frequency multiplier 42, the output pulses of which are assumed to be symmetrical, is connected to a control input of the digital-analog-converter 47 for controlling this to generate a pulse train that has a pulse repetition rate of 2,100 Hz and a duty cycle of 50 percent and that is amplitude modulated in correspondence with the average values obtained from the AND-circuits 40 and 41 and consequently corresponds to the average amplitude value of the respective time slots 5 – 10. The pulse train is supplied on an output *u*.

In order to accomplish read-out from the register group 14 when the register group 15 is connected for reading the video signal into it, and conversely, and that the counters 43 and 44 are stepped forward alternately during successive picture periods by the output pulses from the frequency multiplier 42, these pulses are fed to forward stepping inputs of the counters 43 and 44 via an AND-gate 48 and 49 respectively, the above-mentioned output X of the flip-flop 31 having one connection directly to a control input o of the AND-gate 49 and a reset input of the counter 43 and another connection via an inverting gate 50 to a control input of the AND-gate 48 and a reset input of the counter 44. The counters 43 and 44 have besides the outputs $d_{1\text{-}80}$ and $d_{1\text{-}80}$ four outputs $d_{0\text{-}III}$ and $d_{0\text{-}III}$ respectively which are the first ones to be activated after resetting. The outputs $d_0$ and $d_0$ respectively are connected to a control input of an AND-gate 51 for reading out a binary synchronization code from a register 52 to the digital-analog-converter 47 so as to generate a synchronization pulse in the above-mentioned pulse train, and the outputs $d_I$ and $d_I$ are both connected to a control input of an AND-gate 53 for reading out a binary control information from a register 54 to the digital-analog-converter 47 that incorporates the control information in the pulse train in the form of an amplitude modulated pulse. The control information indicates whether the comparison circuit 33 has determined equal picture periods or not and is supplied to the register 54 whereby the binary value on the output of the AND-gate 36 is read into a flip-flop 55 having a clock input fed with the above-mentioned narrow picture period pulses, a binary 1 determining a first binary number and a binary 0 determining a second binary number to be read out from the register 54 via the AND-gate 53. The outputs $d_{II}$ and $d_{III}$ and the outputs $d_{II}$ and $d_{III}$ respectively of the counters 43 and 44 are according to the example left unconnected but can of course be employed for supplying further control information to the digital-analog-converter 47 to be incorporated in the pulse train for enabling e.g., control of transmission errors in a known manner.

FIG. 4 shows the amplitude modulated pulse train generated by the digital-analog-converter 47 during one picture period of 0.04 seconds, the pulse positions sequentially numbered in correspondence with the outputs of the counters 43 and 44. The digital-analog-converter 47 generates according to the example an average voltage level in the pulse train distinguished from zero-voltage level which level is reserved for solely the first pulse position 0 that is employed for the synchronization pulse. The above-mentioned control information is transmitted in the pulse position I while the pulse positions II and III are according to the example not employed for any information transmission. The amplitude information in the respective time slots 5 – 10 in the video signal is transmitted in the pulse positions 1–80. Positive modulation is used, i.e., maximum pulse voltage U corresponds to the white level, and the black level is distinguished from the zero-voltage level. The pulse train in FIG. 4 can after being appropriately filtered in a low pass filter be fed to a low quality transmission medium for audio signals, where it will occupy a frequency band of 2,100 ± 1,050 Hz and carry information on 32 light intensity levels in the selected time slots 5 – 10. This number of levels can be reduced considerably during the transmittal due to the influence by noise without suffering the loss of any essential information. When information corresponding to printed text or similar pictorial data is transmitted it is of course sufficient to transmit 2 light intensity levels.

FIG. 5 shows a picture receiver that has an input *i* via which the pulse train of FIG. 4 is fed to an analog-digital-converter 60 that works with 5 binary bits and to a synchronization pulse detecting circuit 61 that also regenerates the pulse timing frequency of the pulse train in the form of narrow pulses with a repetition rate of 2,100 Hz. These pulses control the analog-digital-converter 60 via a control input of the same so that the pulse train is read into it at the center interval of the pulse positions in the pulse train of FIG. 4 so as to read only the peak values and to step alternately during successive synchronization pulse intervals, that mark picture periods of 0.04 seconds two counters 62 and 63 forward, 84 outputs $e_{0\text{-}III,\ 1\text{-}80}$ and $e_{0\text{-}III,}{}'_{\ 1\text{-}80}$ of which being activated in a sequential order to control the read out of the output signal from the analog-digital converter 60. The forward stepping of the counters 62 and 63 alternately during successive synchronization pulse intervals is obtained whereby upon the detection of a synchronization pulse the circuit 61 supplies a picture switching pulse to a flip-flop 64 to switch this, the flip-flop 64 having one direct output R connected to a control input of an AND-gate 65 on the forward stepping input of the counter 62 and to a reset input of the counter 63 and another inverting output R′ connected to a control input of an AND-gate 66 on the forward stepping input of the counter 63 and to a reset input of the counter 62.

The counters 62 and 63 activate during their forward stepping first the output $e_0$ and $e_0'$ respectively, which according to the example are left unconnected. The output $e_I$ and $e_I'$ respectively control an AND-circuit 67 which is connected to the output of the analog-digital-converter 60 and on an output of which the control information in the pulse position I in the pulse train of FIG. 4 regarding whether equal picture periods have occurred in succession at the transmitter terminal or not is supplied in the form of a binary 0 for equal picture periods and a binary 1 for different picture periods. The outputs $e_{II}$ and $e_{III}$ and the outputs $e_{II}'$ and $e_{III}'$ respectively of the counters 62 and 63 are as well as the outputs $e_0$ and $e_0'$ left unconnected, according to the example, while the outputs $e_{1\text{-}80}$ and $e_{1\text{-}80}'$ control 80 AND-circuits 68 and 69 respectively for reading the output signal of the analog-digital-converter 60 in the pulse positions 1 – 80 of FIG. 4 alternately into 80 registers 70 and 71 respectively during successive synchronization pulse intervals. Upon the initiation of every new synchronization interval that register of the registers 70 and 71 into which said output signal is to be read is reset whereby these have a reset input connected to the output R and R′ respectively of the flip-flop 64.

When equal picture periods are transmitted indicated by a binary 0 occurring in the pulse position I of FIG. 4 on the output of the AND-circuit 67, the picture switching pulses on the output of the circuit 61 are fed via an AND-gate 72, an inverting input of which is connected to the output of AND-circuit 67, to a forward stepping input of a counter 73 consisting of 11 flip-flops to step this forward in correspondence with the stepping forward of the counter 35 at the transmitter terminal. When different picture periods are transmitted indicated by a binary 1 on the output of the AND-circuit 67 the picture switching pulses are instead fed via an AND-gate 74 to a reset input of the counter 73.

Read-out from the registers 70 and 71 shall be fed alternately during successive picture periods of 0.04 seconds to an assemblage and display unit 75 that is of a known construction and according to the example comprises a dynamic digital memory, a digital-analog converter and a video monitor and is described for example in U.S. Pat. No. 3,663,749. The switching of the successive picture fields in the display unit 75 is controlled in the following manner: The picture switching pulses from the circuit 61 are supplied to a frequency multiplier 76 which employs the factor 2 and the output pulses of which switch a flip-flop 77. This activates an AND-gate 78 which is normally inhibited and an input of which is fed with pulses that have a line sweep frequency of 15,625 Hz and are supplied from an output L' of the display unit 75. That line sweep pulse from the output L' that first occurs after the switching of the flip-flop 77 passes the AND-gate 78 and generates on its output a picture field synchronization pulse that has a frequency of 50 Hz and is supplied to an input F' of the display unit 75 and to a reset input of the flip-flop 77 whereby this is switched again and the AND-gate 78 will then be inhibited until next output pulse from the frequency multiplier 76 occurs.

Time slots for reading out the contents in the register 70 and 71 are generated in the same way as at the transmitter terminal. Sampling pulses that have a frequency of 8 MHz are taken from an output S' of the display unit 75 to step a counter 79 which consists of 5 flip-flops and is reset upon the initiation of every new line sweep period by the pulses on the output L', and to step via an decoder 80 a counter 81 forward one step for each period of 32 sampling pulses. The counter 81, that in the same way is upon the initiation of every new line sweep period reset by the picture field synchronization pulses supplied on the output L', activates via 10 outputs $h_{1\text{-}10}$ 10 AND-gates 82 during the occurrence of the time slots 5 along the horizontal time axis in FIG. 1 so as to provide read-out of the contents in the registers 70 and 71.

The pulses from the output L' are also used for stepping forward a counter 83 which consists of 5 flip-flops, is reset upon the initiation of every new picture field period by the picture field synchronization pulses supplied on the output of the AND-gate 78, and steps via a decoder 84 alternately during successive picture periods of 0.04 seconds two counters 85 and 86 forward one step for each period of 32 line sweep pulses. The counters 85 and 86 which are reset upon the initiation of every new picture field period by said picture field synchronization pulses, activate alternately during successive picture periods via 8 outputs $g_{1\text{-}8}$ and $g_{1\text{-}8}'$ respectively 2 AND-circuits 87 and 88 consisting of 8 gates each during the occurrence of the time slots 5 along the vertical time axis in FIG. 1 so as to provide readout of the contents in the registers 70 and 71.

In order to provide output from the register 70 when the register 71 is connected for input and conversely, and step the counters 85 and 86 forward alternately during successive picture periods, the above-mentioned output R of the flip-flop 64 has one direct connection to a control output of an AND-gate 89 on the forward stepping input of the counter 86 and another connection via an inverting circuit 90 to a control input of an AND-gate 91 on the forward stepping input of the counter 85.

The counter 81 has four unconnected outputs $h_{0\text{-}III}$ that are first activated after resetting and the counters 85 and 86 have unconnected outputs $g_0$ and $g_0'$ respectively that are first activated after resetting to obtain that the time frame 4 is positioned within the picture field 1 in accordance with FIG. 1.

A decoder 92 is connected to the counter 73 to determine how many equal picture periods this has counted and in dependence thereon control the decoders 80 and 84 in such a way that outputs $t$ and $t'$ respectively of these are activated during the occurrence of first the respective time slots 5 along the horizontal and vertical time axis respectively of FIG. 1 and thereafter during the occurrence of the sub time slots 6, 7, 8, 9 and 10 respectively of FIG. 2 selected during successive picture periods sequentially from the left side to the right side and from the upper side to the lower side within the time slots 5. The output t of the decoder 80 controls an AND-gate 93 and the output V of the decoder 84 controls an AND-gate 94 connected in cascade with the AND-gate 93 to transfer the contents in the registers 70 and 71 to a video input V' of the display unit 75 to be read into its internal dynamic digital memory in dependence on a control input Z simultaneously being supplied with a write enabling pulse obtained from an AND-gate 95 when both the outputs $t$ and V are activated.

FIG. 6 shows an example of an application for the picture transmitter and the picture receiver of FIGS. 3 and 5 respectively for the transmittal of moving as well as static images from a camera 101 corresponding to the camera 11 to a display unit 102 corresponding to the display unit 75 via an encoder 103 of the construction shown in FIG. 3, an established telephone connection between two telephone units 104 and 105, and a decoder 106 of the construction shown in FIG. 5. An audio tape recorder 107 is employed at the transmitter terminal so as to record the images and thereafter transmit them at arbitrarily selected occasions and an audio tape recorder 108 is employed at the receiver terminal to record the transmitted images for reproducing them later on. The bandwidth that is used for the transmittal and the recording is according to the example 2,100 ± 1,050 Hz.

The telephone unit 104 can be provided with a speech detector of a known construction which transfers the output signal of the encoder 103 to the established telephone connection when speech does not occur and inhibits this transfer when speech does occur. In this way it is possible to transmit both speech and pictures over the telephone connection. When potraits are to be transmitted, interruptions in the order of one second are sufficient for the picture transmittal, while document transmittal requires that the speech is interrupted during longer time intervals so as to provide the necessary resolution.

The camera 101 and the display unit 102 have been assumed to work in accordance with the CCIR-standard. The video signal that is assembled in the display unit 102 can therefore be fed via a HF-modulator 109 of known construction to the HF-input of a TV-receiver 110 built for the reception of CCIR television broadcasting, whereby the pictures in the display unit 102 can be magnified to be viewed in larger dimensions.

The invention has here been described by means of an example of an embodiment the parts of which can be constructed in many ways within the scope of the invention. For example, the video signal can be assembled in the display unit 102 by means of a magnetic storage medium in the form of a tape, a disc or a drum, a storage tube comprising silicon cells, a charge coupled semiconductor memory, or upon the very picture screen of the display unit 102 in which latter case a storage picture tube is employed and the pictures can be given a certain degree of gray scale by raster modulation instead of intensity modulation. Read-out of the assembled video signal can then be accomplished by directing a video camera toward the screen of the display unit 102.

The invention is not limited to digital signal processing and analog signal transmission. Charge coupled semiconductor memories make in principle analog signal processing possible. On the other hand, many reasons speak for digital signal transmission as well as digital signal processing, implying that the digital-analog-converter 47 in FIG. 3 and the analog-digital converter 60 in FIG. 5 can be omitted.

A picture transmission according to the invention does not necessarily have to depend on interruptions in the speech signal on an established telephone connection. Besides the possibility to compress the bandwidth of the speech signal in known manner so that pictures and speech can be transmitted simultaneously there is also the possibility of increasing the bandwidth of the connection in a known manner in such a way that the calling party dials a prefix before the called number.

The progressive sampling of a picture according to the invention is well suited for the transmission of colour information during the time slots 10 in FIG. 2 in accordance with what is described in U.S. Pat. No. 3,663,749.

The method of sampling progressively according to the invention implies in fact that a quasi-stationary signal is first during short sampling periods cautiously sampled on its low-frequency components and is thereafter more and more confidentially during successively prolonged sampling periods sampled on its high-frequency components. This method sampling is applicable also to other types of quasi-stationary signals and the invention is therefore not limited to solely video signals but incorporates for example also speech signals.

We claim:

1. Method of sampling a quasi-stationary signal progressively during a sampling period comprising a plurality of successive periods of a fundamental component in the signal, comprising the steps of continuously counting during a plurality of successive sampling periods the actual number of periods of said fundamental component occurring after a selected starting sampling period, successively prolonging said sampling periods in dependence on the increasing magnitude of said counted number, and progressively sampling said signal during said successively prolonged sampling periods.

2. The method of claim 1, comprising the further steps of continuously reading said signal into a storage medium under control of said fundamental component, continuously comparing the signal content in every new period with the signal content in a preceding period of said fundamental component read into said storage medium to determine when repeated and new signal content, respectively occurs, and, upon the determination of new signal content, resetting said continuously counting of said actual number to select a new starting sampling period.

3. The method of claim 1, in which said signal is sampled in such a way that it is read into an accumulating storage medium during a time slot comprising a number of instantaneous amplitude values of said signal being successively reduced in dependence on the increasing magnitude of said counted number, and the average value is generated for said number of instantaneous amplitude values read into said accumulating storage medium during said time slot.

4. The method of claim 3, in which said instantaneous amplitude values of said signals are binary coded, said number of instantaneous amplitude values in said time slot is a number equal to a power of two with an integer as the exponent, and said average value is generated by reading out said accumulated instantaneous amplitude values from said accumulating storage medium with the least significant bit position shifted a number of steps to the left equal to said integer.

5. Apparatus for sampling a quasi-stationary video signal progressively during a sampling period comprising a plurality of picture periods, comprising first and second registers into which the signal content in the video signal is alternately read during successive picture periods, a comparison circuit for comparing the signal contents in said first and second registers to determine when picture periods having repeated and new signal contents respectively occur, a first counter circuit for counting the actual number of picture periods that are in succession determined to have repeated signal contents, a second counter circuit for generating sampling instants progressively during a sampling period comprising a number of successive picture periods, a decoder circuit coupled to said first and second counter circuits for increasing said number of successive picture periods in dependence on that said actual number increases, and a gate circuit coupled to said decoder circuit for sampling the video signal at said sampling instants during said sampling period.

* * * * *

UNITED STATES PATENT AND TRADEMARK OFFICE

CERTIFICATE OF CORRECTION

PATENT NO. : 3,903,362

DATED : September 2, 1975

INVENTOR(S) : Carl Rune Wern; George Herman Wern

It is certified that error appears in the above-identified patent and that said Letters Patent are hereby corrected as shown below:

Column 3, line 45, change "invented" to --invention--.

Column 4, line 18, change "Hz" to --a--.

Column 4, line 18, change "hz" to --Hz--.

Column 4, line 21, change "$^2$log (1+log(Ps/Pn)" to --$^2$log (1+)Ps/Pn)--.

Column 4, line 25, change "fo" to --of--.

Column 4, line 64, change "$b_{1-8}$" (second occurrence) to --$b'_{1-8}$--.

Column 5, line 7, change "X" to --X'--.

* Column 5, line 14 and 15, delete "is positioned". (our error)

Column 5, line 20, change "$b_o$" (second occurrence) to --$b_o$'--.

Column 5, line 48, change "X" to --X'--.

Column 6, line 9, change "8" (first occurrence) to --7--.

Column 6, line 17, change "$C_{1-16}$" to --$C_{1-6}$--.

Column 6, line 45, change "$d_{1-80}$" (second occurrence) to --$d'_{1-80}$--.

UNITED STATES PATENT AND TRADEMARK OFFICE

CERTIFICATE OF CORRECTION

PATENT NO. : 3,903,362

DATED : September 2, 1975

INVENTOR(S) : Carl Rune Wern; George Herman Wern

It is certified that error appears in the above-identified patent and that said Letters Patent are hereby corrected as shown below:

Column 7, line 2, delete "o".

Column 7, line 7, change "$d_{1-80}$" (second occurrence) to $d'_{1-80}$--.

Column 7, line 7, change "$d_{o-III}$" (second occurrence) to --$d'_{o-III}$--.

Column 7, line 9, change "$d_o$" (second occurrence) to --$d'_o$--.

Column 7, line 14, change "$d_I$" (second occurrence) to --$d'_I$--.

Column 7, line 25, change "1" to --"1"--.

Column 7, line 26, change "0" to --"0"--.

Column 7, line 29, change "$d_{II}$ and $d_{III}$" to --$d'_{II}$ and $d'_{III}$--.

Column 8, line 10, change "$e_{o-III'}$,$_{1-80}$" (second occurrence) to --$e'_{o-III, 1-80}$--.

Column 8, line 26, change "$e_o$ and $e_o$'" to --$e_o$ and $e'_o$--.

* Column 8, line 26, change "output" to --outputs--. (our error)

Column 8, line 28, change "$e_1$ and $e_1$'" to --$e_1$ and $e'_1$--.

UNITED STATES PATENT AND TRADEMARK OFFICE

CERTIFICATE OF CORRECTION

PATENT NO. : 3,903,362

DATED : September 2, 1975

INVENTOR(S) : Carl Rune Wern; George Herman Wern

It is certified that error appears in the above-identified patent and that said Letters Patent are hereby corrected as shown below:

* Column 8, line 28, change "output" to --outputs--. (our error)

Column 8, line 34, change "o" to --"O"--.

Column 8, line 35, change "l" to --"1"--.

Column 8, line 36, change "$e_{II}$' and $e_{III}$'" (second occurrence) to --$e'_{II}$ and $e'_{III}$--.

Column 8, line 38, change "$e_o$ and $e_o$'" to --$e_o$ and $e'_o$--.

Column 8, line 39, change "$e_{1-80}$ and $e_{1-80}$'" to --$e_{1-80}$ and $e'_{1-80}$--.

Column 8, line 51, change "0" to --"0"--.

Column 8, line 60, change "l" to --"l"--.

Column 9, line 27, change "an" to --a--.

Column 9, line 47, change "$g_{1-8}$ and $g_{1-8}$'" to --$g_{1-8}$ and $g'_{1-8}$--.

Column 9, line 51, change "readout" to --read-out--.

Column 9, line 64, change "$g_o$ and $g_o$'" to --$g_o$ and $g'_o$--.

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*